United States Patent [19]

Fladl et al.

[11] Patent Number: 5,692,662
[45] Date of Patent: Dec. 2, 1997

[54] DEVICE FOR INSERTING AND DRAWING A LEADER SPRING IN CONDUITS FOR ELECTRICAL WIRING SYSTEMS

[76] Inventors: Gerold Fladl, Hauptstrasse 29, 8650 Kindberg; Franz Fladl, Sportgasse 127, 8644 Mürzhofen, both of Austria

[21] Appl. No.: 423,533

[22] Filed: Apr. 17, 1995

[51] Int. Cl.$^6$ .................... B65H 20/00; B65H 59/22
[52] U.S. Cl. ............. 226/177; 226/187; 254/134.3 FT
[58] Field of Search ........................... 226/177, 181, 226/183; 254/134.3 FT

[56] References Cited

U.S. PATENT DOCUMENTS

| | | | |
|---|---|---|---|
| 1,959,490 | 5/1934 | Mistelski | 254/134.3 FT |
| 3,610,582 | 10/1971 | Passoni | 254/134.3 FT |
| 4,138,048 | 2/1979 | Lemmon | 226/181 |
| 5,321,792 | 6/1994 | Schönherr et al. | 226/181 |

FOREIGN PATENT DOCUMENTS 1803125   6/1969   Germany .............. 254/134.3 FT

*Primary Examiner*—Daniel P. Stodola
*Assistant Examiner*—Matthew A. Kaness
*Attorney, Agent, or Firm*—Henry M. Feiereisen

[57] ABSTRACT

A device for inserting or threading and drawing a leader spring in conduits for electric wiring systems includes a housing closable by a lid and accommodating at least one driven roller for cooperation with a counterpressure roller accommodated in the lid. The driven roller and the counterpressure roller cooperate with each other in such a manner that the leader spring is retained and guided therebetween.

7 Claims, 2 Drawing Sheets

DEVICE FOR INSERTING AND DRAWING A LEADER SPRING IN CONDUITS FOR ELECTRICAL WIRING SYSTEMS

BACKGROUND OF THE INVENTION

The present invention refers to a device for inserting and drawing a leader spring in conduits or like pipes for electrical wiring systems.

In general, a leader spring or snake is used to fill a conduit with electric wires or to remove the wires from the conduit. Hitherto, the insertion or threading of a leader spring is relatively time consuming and tedious, especially when the leader spring should be inserted in a conduit which is already filled with wires.

SUMMARY OF THE INVENTION

It is an object of the present invention to provide an improved device for inserting and drawing a leader spring of the above-mentioned type, obviating the aforestated drawbacks.

In particular, it is an object of the present invention to provide an improved device for inserting and drawing a leader spring in conduits for electrical wiring systems in an easy and yet effective manner.

These objects, and others which will become apparent hereinafter, are attained in accordance with the present invention by providing a housing which is closable by a lid and accommodates at least one driven roller which cooperates with a counterpressure roller retained in the lid in such a manner that the leader spring is retained and guided therebetween.

By being guided between the driven roller and the counterpressure roller, the leader spring can be easily pushed into a conduit and withdrawn therefrom together with attached wires. In order to effect a sufficient frictional engagement, the leader spring is clamped between the driven roller and the counterpressure roller for suitable guidance of the leader spring in or from the conduit.

In accordance with a further feature of the present invention, the housing is provided with a plurality of such driven rollers, with a counterpressure roller being arranged between and bearing upon two neighboring driven rollers when the housing is closed by the lid. The arrangement of several driven rollers and several counterpressure rollers allows the application of a driving force which is distributed over a greater area so that a greater driving force is exerted upon the leader spring.

Suitably, the contact pressure of the counterpressure rollers upon the driven rollers is controlled by an adjusting unit in order to reduce the stress upon the leader spring. The use of the adjusting unit enable to minimize the contact pressure to such a degree that the leader spring is gently treated while yet allowing application of a force which is sufficient to move the leader spring in or out of the conduit.

In order to improve the guiding of the leader spring during advance in or out of the conduit, the driven rollers may be provided with V-shaped notches for receiving the leader spring, and the housing may be formed on its front end face with a prolongation which extends in direction of the leader spring and has a groove for supporting the leader spring in a proper alignment with regard to the conduit.

In accordance with another feature of the present invention, the rollers are driven via a gearing by an electromotor which rotates in both directions, with the power source, preferably a rechargeable battery, being accommodated in a handle of the housing. In this manner, the prolongation of the housing can be inserted together with the tip of the leader spring into the conduit while the device can be more securely held.

BRIEF DESCRIPTION OF THE DRAWING

The above and other objects, features and advantages of the present invention will now be described in more detail with reference to the accompanying drawing in which the FIG. 1 shows a schematic illustration of a device for inserting and drawing a leader spring in conduits for electrical wiring systems, in accordance with the present invention.

DETAILED DESCRIPTION OF A PREFERRED EMBODIMENT

Figure 1:
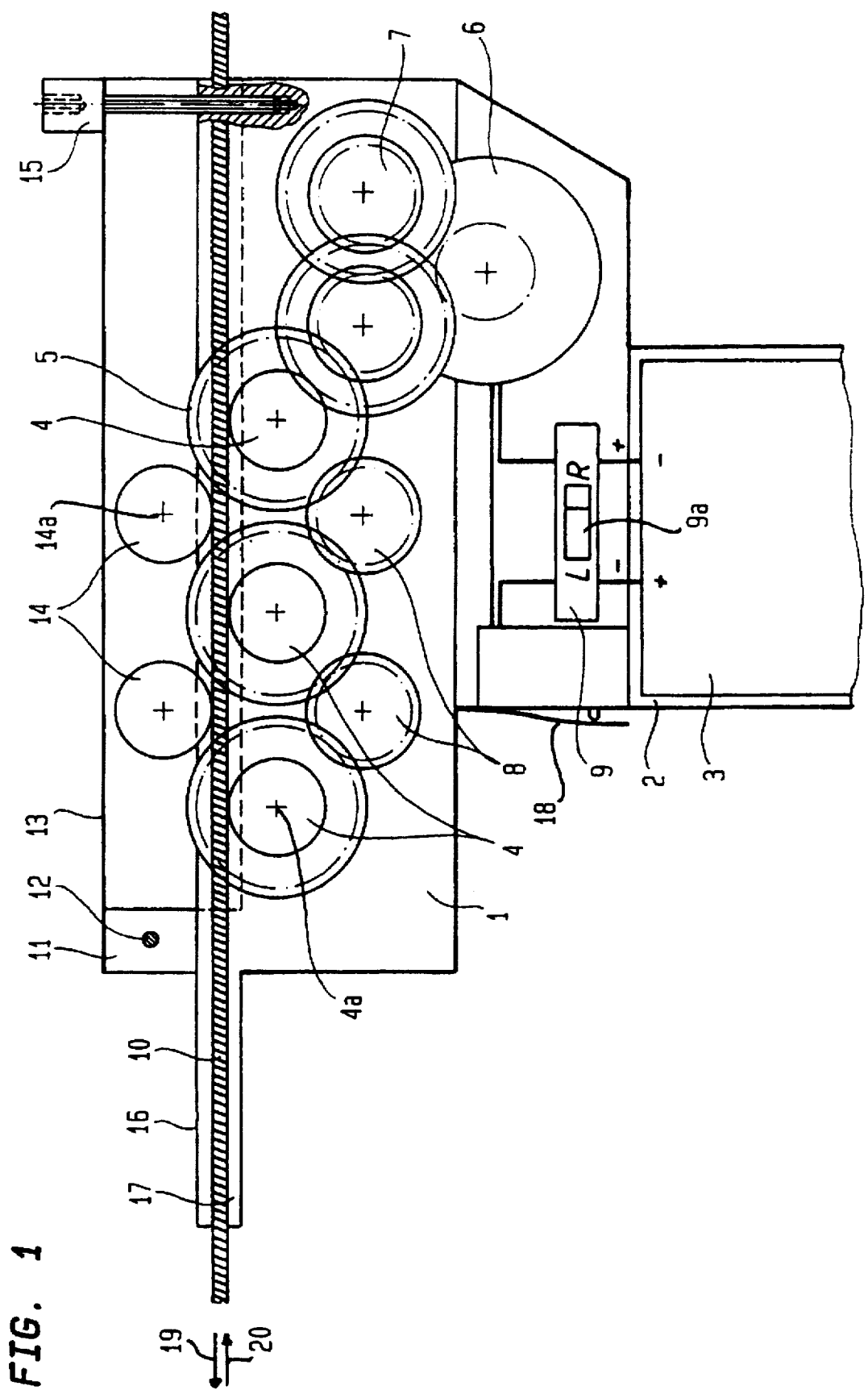

Turning now to FIG. 1, there is shown a schematic illustration of a device for inserting and drawing a snake or leader spring 10 in conduits for electrical wiring systems, including a housing 1 having a handle 2 in which a rechargeable battery 3 is contained. Arranged within the housing 1 are a plurality of rollers 4 which are rotatably mounted on axles 4a. Each roller 4 is connected to a gear rim 5 in a manner that the roller 4 and the gear rim 5 are secured against relative rotation. A motor 6 is mounted to the housing 1 to operate the rollers 4 via a gearing 7 and gears 8 which are in mesh with the gear rims 5 of the rollers 4. The motor 6 is activated by an on/off switch 18 on one end face of the handle 2 for easy access and activation by a hand of the user.

The motor 6 is connectable via a reversing switch 9 with the rechargeable battery 3 for operation in both directions of rotation as indicated by reference characters L and R and effected by a shifter 9a. Thus, the leader spring 10 can be advanced in direction of arrow 19 into a conduit (not shown) and upon changeover of the reversing switch 9 via the shifter 9a be withdrawn from the conduit in direction of arrow 20.

The housing 1 is provided with an upwardly extending projection 11 for swingably supporting a lid 13 about a pivot axis 12 so that the housing 1 can be opened and closed by the lid 12. Accommodated within the lid 13 are counterpressure rollers 14 which are rotatably mounted on axles 14a suitably supported by the lid 13.

In the nonlimiting example of FIG. 1, the housing 1 carries three rollers 4 and the lid 13 carries two counterpressure rollers 14 which are positioned upon closing of the housing 1 by the lid 13 in such a manner that always one counterpressure roller 14 is arranged between two neighboring rollers 4. Thus, the counterpressure rollers 13 and the rollers 4 cooperate with each other to clamp the leader spring 10 therebetween and to create a required frictional engagement.

In order to reduce the stress upon the leader spring 10 and to minimize the contact pressure to such a degree that the leader spring 10 is gently treated while yet allowing application of a sufficient force to move the leader spring 10 in or out of the conduit, the contact pressure applied by the counterpressure rollers 14 upon the driven rollers 4 is controlled by an adjusting unit 15 in form of a bolt with external socket head. By inserting an appropriate wrench (not shown) in the socket head, the bolt 15 can be turned to adjust the distance between the lid 13 and the housing 1 and thereby control the contact pressure of the rollers 4 upon the leader spring 10.

The housing 1 is further provided on one end face with a prolongation 16 which is formed with a lateral groove 17 for supporting and guiding the leader spring 10. When operating the device, the housing 1 is positioned such that the prolongation 16 enters together with the leader spring 10 into the conduit. After starting the motor 6 through actuation of the switch 18 and proper positioning of the shifter 9a, the leader spring 10 is pushed into the conduit in direction of arrow 19. By sliding the shifter 9a into the other position to effect a reversal of the switch 9, the motor 6 turns in the other direction of rotation to withdraw the leader spring 10 from the conduit in direction of arrow 20.

Figure 2:
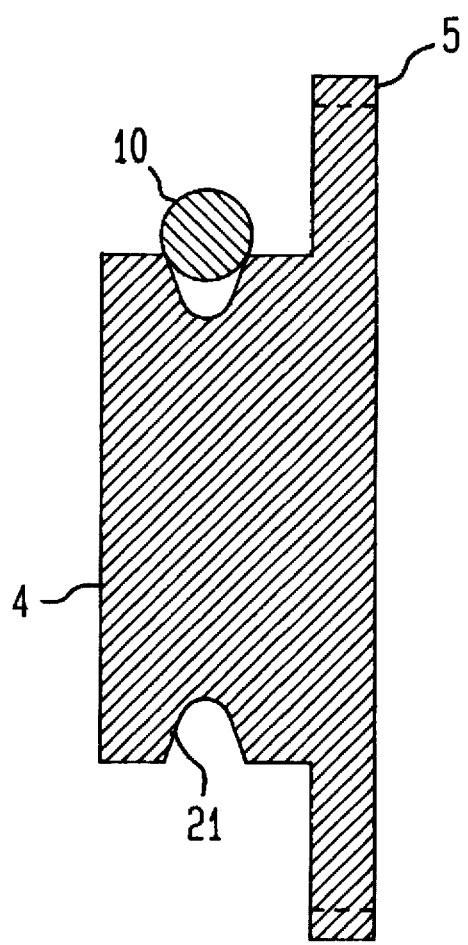
FIG. 2 is a cross sectional view of a modified roller of the device of FIG. 1 for improving a guidance of the leader spring during advance.

As shown in FIG. 1, the leader spring 10 sits on the running surface of the rollers 4. In order to improve the guidance of the leader spring 10 during its advance to or from the conduit, the rollers 4 may be provided with circumferential V-shaped notches 21, shown in FIG. 2, for receiving the leader spring 10.

In general, it is also possible to configure the lid 13 in such a manner as to cover the entire top side of the housing 1 so that the prolongation 16 is split along its central line, with the connection of such a lid with the housing being effected e.g. by tensioning screws which simultaneously enable an adjustment of the contact pressure of the rollers 4 upon the leader spring 10. Suitably, both parts of the prolongation may be provided with longitudinal grooves for supporting and guiding the leader spring 10 to enable a particularly effective guide mechanism for the leader spring 10.

While the invention has been illustrated and described as embodied in a device for inserting and drawing a leader spring in conduits for electrical wiring systems, it is not intended to be limited to the details shown since various modifications and structural changes may be made without departing in any way from the spirit of the present invention.

What is claimed as new and desired to be protected by Letters Patent is set forth in the appended claims:

1. A device for inserting and drawing a leader spring in conduits for electrical wiring systems, comprising:

a housing;

a lid attached to said housing;

at least one driven roller accommodated in said housing;

a counterpressure roller accommodated in said lid, said counterpressure roller and said driven roller cooperating with each other to guide and retain a leader spring therebetween;

an adjusting unit for controlling the contact pressure of said counterpressure roller against said driven roller, said adjusting unit including a bolt threaded into aligned bores of said lid and said housing and so rotatable as to allow control of a spacing between said lid and said housing and to thereby adjust a pressure exerted onto the leader spring.

2. The device of claim 1 wherein said housing is provided with a plurality of such driven rollers, with one counterpressure roller being arranged between and bearing upon two neighboring driven rollers when said housing is closed by said lid.

3. The device of claim 1 wherein said lid is swingably mounted to said housing.

4. The device of claim 1 wherein said driven roller has a surface exhibiting a V-shaped notch.

5. The device of claim 1 wherein said housing has one end provided with a prolongation which includes a groove for supporting and guiding the leader spring.

6. The device of claim 1 wherein said housing has a handle, said device further comprising an electromotor operating in both directions of rotation for actuating said roller via a gearing, and a power source operatively connected to said electromotor and accommodated in said handle.

7. The device of claim 6 wherein said power source is a rechargeable battery.

* * * * *